Figure 1:
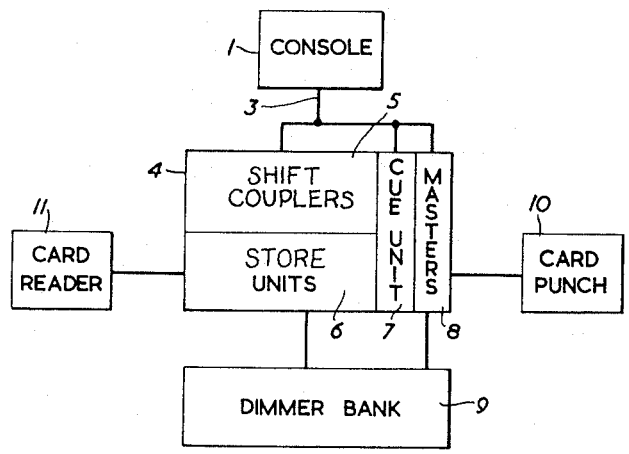

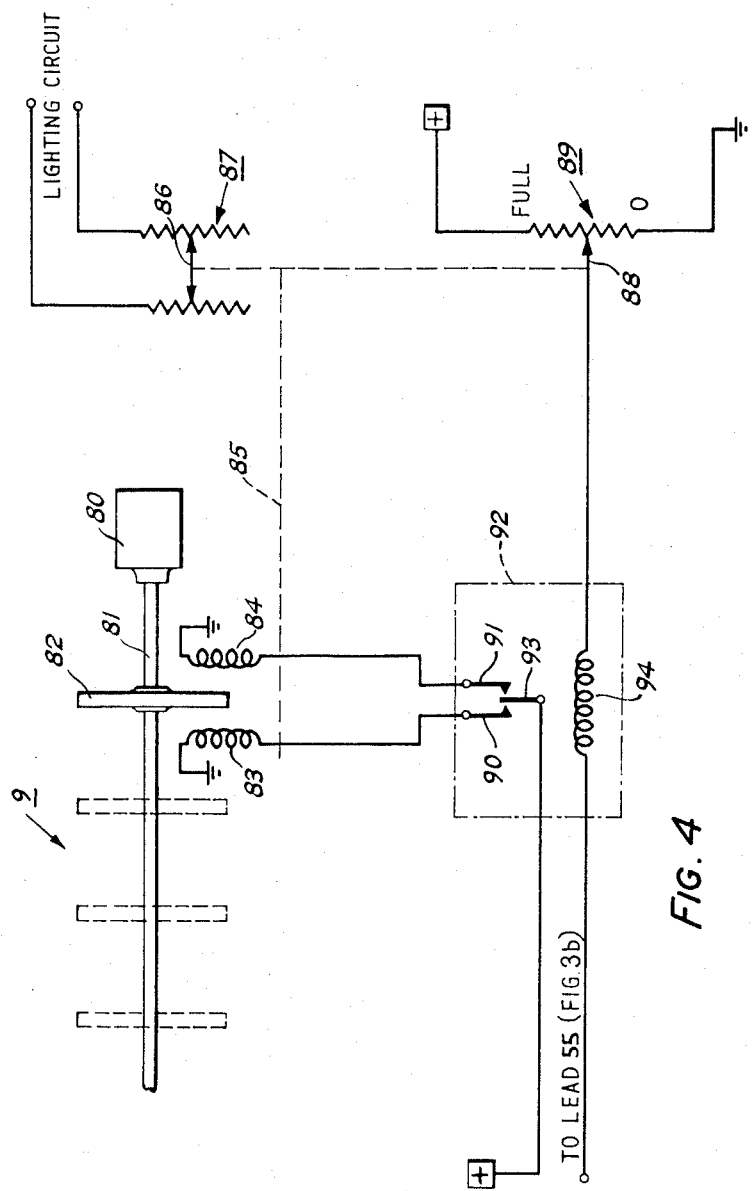

3,004,193
CONTROL OF LIGHTING FOR VARIABLE EFFECT
Frederick Percy Bentham, London, and Leonard Wiggett Leggett, Maidstone, England, assignors to The Strand Electric and Engineering Company Limited, London, England, a company of Great Britain
Filed Aug. 19, 1959, Ser. No. 834,723
Claims priority, application Great Britain Aug. 22, 1958
7 Claims. (Cl. 315—295)

The present invention relates to control apparatus for the control of lighting for variable effect, more particularly for the control of stage lighting in theatres and in television studios.

In the lighting of theatre and television studio stages, a large number of lighting circuits, each with its appropriate dimming device, are provided. The dimming device may comprise a variable resistance, a tapped transformer, a saturable reactor or a gas filled triode valve, any of which by varying the voltage applied to the corresponding lighting circuit, gives a number of imperceptible steps of light intensity. The dimming devices are actuated by remote control by means of miniature dimmer levers which in the case of the first two of the above-mentioned devices are connected by an electro mechanical arrangement to the dimmer arms for effecting actuation thereof and in the case of the latter two abovementioned dimming devices, the miniature levers are connected to means for varying the current fed to the saturation coil of the reactor or to the grid of the triode valve.

The miniature dimmer levers are mounted in a remote control panel or console, there being one lever for each lighting circuit, the position of which gives an indication of the condition of the dimmer associated therewith and thus the corersponding intensity of light given by the lighting circuit. By suitably operating selected of the levers, the stage lighting can be balanced to give a desired lighting effect; thus a powerful lamp may for a period be run at reduced light intensity while other lamps are allowed to become dominant. This balancing may be required for brightness regulation or in the case of colour lighting, for colour change in addition.

One set of light intensities or colours are required to follow another set with the dimming devices differently adjusted to give a gradual change of lighting effect, as for example, in representing a sunset or dawn. In addition, complete changes of lighting effect are required to correspond with a change of scene.

In the theatre, all such changes are concentrated to a greater or less extent in one area i.e. the stage, but in television studios there may be in effect several stages ranged around the studio and the actors and television cameras visit the stages in turn. As an example, a lighting programme may comprise:

(a) Scene 1: opening lighting.
(b) Scene 1: sunset lighting.
(c) Scene 1: sunset lighting plus Scene 2 opening lighting, e.g. for preview purposes, and
(d) Cut out Scene 1 lighting and maintain Scene 2 lighting.

The programme may cover a large number of scenes not necessarily in strict sequence and changes from one lighting set-up to another may be gradual as in the case of (b) or sudden as in (d), but in either event the dimming devices have to be operated to take up the new adjustments required.

The method hitherto adopted to cover these various changes is known as multi-scene preset and requires the provision of a plurality of dimmer levers common to each lighting circuit, ten such common levers being quite usual. This number of levers involves making the levers very small which, although rendering them inconvenient in operation is necessary to avoid the control panel or console from becoming too large. Furthermore, the provision of ten levers to each lighting circuit has been found inadequate and even larger numbers have to be contemplated, but it is difficult to provide conveniently enough sets of levers to correspond to the number of changes of light intensity required and these levers have to be reset to fresh intensities once they have been operated to give a desired lighting set-up. This involves the provision of a written plot of the dimmer levels and circuits for each lighting change.

It is however, a feature of television productions that although time may exist for the preparation and planning of the lighting changes before the production arrives in the studio, actual studio time is very limited. However, the dimmer intensity levels can only be set in the studio when the scenery, actors and lighting are rehearsed and viewed on monitors which show the results as seen by the cameras. There is therefore unlikely to be sufficient time to write carefully a plot which will enable the desired results established at the rehearsals to be repeated exactly for the final run-through and transmission.

It has been suggested to record on cards such as are commonly used in computers, the dimmer levels and other switching requirements and such recording may be made by using a pen or pencil to black-in selected areas of the card or the recording may be effected by punching holes in the card. The cards are subsequently read by a reproducing apparatus which causes the dimmers and switches to take up positions in accordance with the record on each card.

The use of a punched card system in conjunction with the known dimmer actuating equipment is not entirely suitable because in the case of television studios, a production is subject to last minute changes right up to the time of transmission and, in case of emergency, during the transmission itself. It has been suggested that the method of recording on the cards by means of pen or pencil allow changes and modifications to be more readily effected than with a punched card, but in fact the use of a pencil or pen is an operation similar to that of writing a plot and is therefore subject to the objection previously mentioned. Furthermore, with such systems the lighting set-up is determined by a card positioned in the card reader and in order to change such a set-up, it is necessary to remove the card from the reader to effect the desired changes of the record thereon and replace the card in the reader. It is not possible, therefore, for the operator to effect immediate changes in a given lighting set-up.

It is an object of the present invention to provide a stage lighting control apparatus which allows the lighting operator to set the dimmer controls in the normal manner and once the desired lighting has been set, to record automatically the state of the dimmer and switch controls for subsequent reproduction. It is a further object of the invention to provide means whereby the operator has an over-riding control of the dimmer positions so that he can effect immediate changes in a lighting set-up read from a card or other record.

According to the invention control apparatus for the control of stage lighting for variable effect comprises individual control means for controlling the setting of a dimming device in each lighting circuit, means for recording automatically in the form of stored information the condition of the said individual control means for giving a desired lighting effect, and means responsive to said stored information for controlling the setting of the dimming devices whereby the said lighting effect can be reproduced exactly as and when required.

The said individual control means are arranged so that they effect an over-riding control of the setting of the dimming devices so that when the dimming devices are set according to the stored information for a given lighting effect, the lighting can be instantly modified as required by actuating an appropriate individual control and the lighting set-up as thus modified can be recorded for future use.

According to a further feature of the invention, a visual indicating means is provided to give to the operator of the apparatus an indication of the setting of the dimming devices of the respective lighting circuits and also to indicate any change in the condition of the individual control means before the condition of the appropriate dimming device is correspondingly changed. As previously mentioned, in the multi-scene preset method of operation, it is necessary to provide a multiplicity of individual control means for each dimming device and this may result in the control panel or console becoming too large for convenient operation. According to a still further feature of the invention, there is provided a means whereby the individual control means can be selectively connected to the dimming devices. In this manner, a given number of an individual control means can be employed to control the setting of a much larger number of dimming devices by connecting the individual control means to a corresponding number of dimming devices, setting the dimming devices as required, and then transferring the individual control means to further of the dimming devices and then setting the said further dimming devices, and so on.

In one form of the invention, each of a number of individual dimmer controls is actuated by a series of push buttons to give the required increments of light intensity from no light to full light. As each push button is depressed it lights internally and extinguishes the lighting in the others of the series, thereby giving a visual indication of the level of light intensity selected. Each push button is connected in a Wheatstone bridge servo circuit which determines the intensity position which an electro-mechanically driven dimmer will occupy, the actuation of the dimmer being further controlled by the closing of a dimmer driving motor master switch and the setting of a motor speed regulator.

Once each series of dimmer push buttons has been operated to give the appropriate lighting set-up, the output of the circuit in which the push buttons are connected is transferred by a record master control to an electric punch which cuts corresponding holes in a record card. This card can subsequently be read automatically and the electrical connections existing at the time of its cutting are reproduced in such a way as to drive the dimmers to the appropriate levels and to light the lamps inside the corresponding push buttons so that the operator is given a visual indication of the dimmer settings.

The speed at which the dimmers take up their selected positions is regulated by the dimmer driving motor speed and in the electro-mechanically driven dimmer, mechanical inertia ensures that the dimmer will hold its position until driven to a new position. Accordingly, in this case, only one card reader is required.

Where, however, saturable reactor or gas filled triode valves or other dimming devices without mechanical inertia are used, two card readers are required which are used alternately. A cross-fader then lessens the potential supplied to one while increasing that supplied to the other, so that the condition of the one is merged into and replaced by the other in respect of the dimmer actuation.

Figure 2:
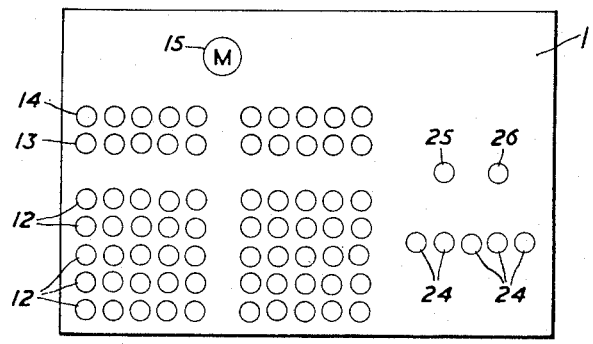
Figure 3A:
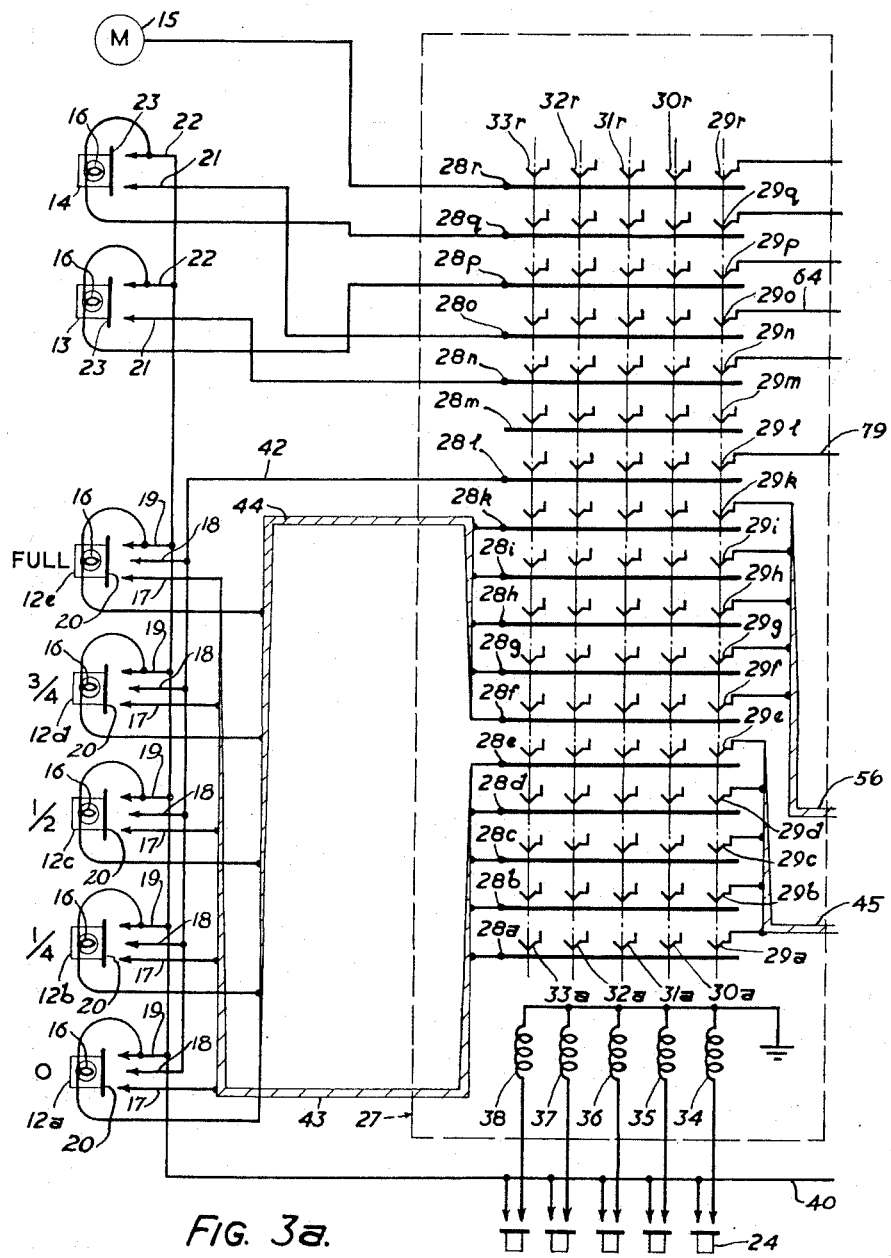
Figure 3B:
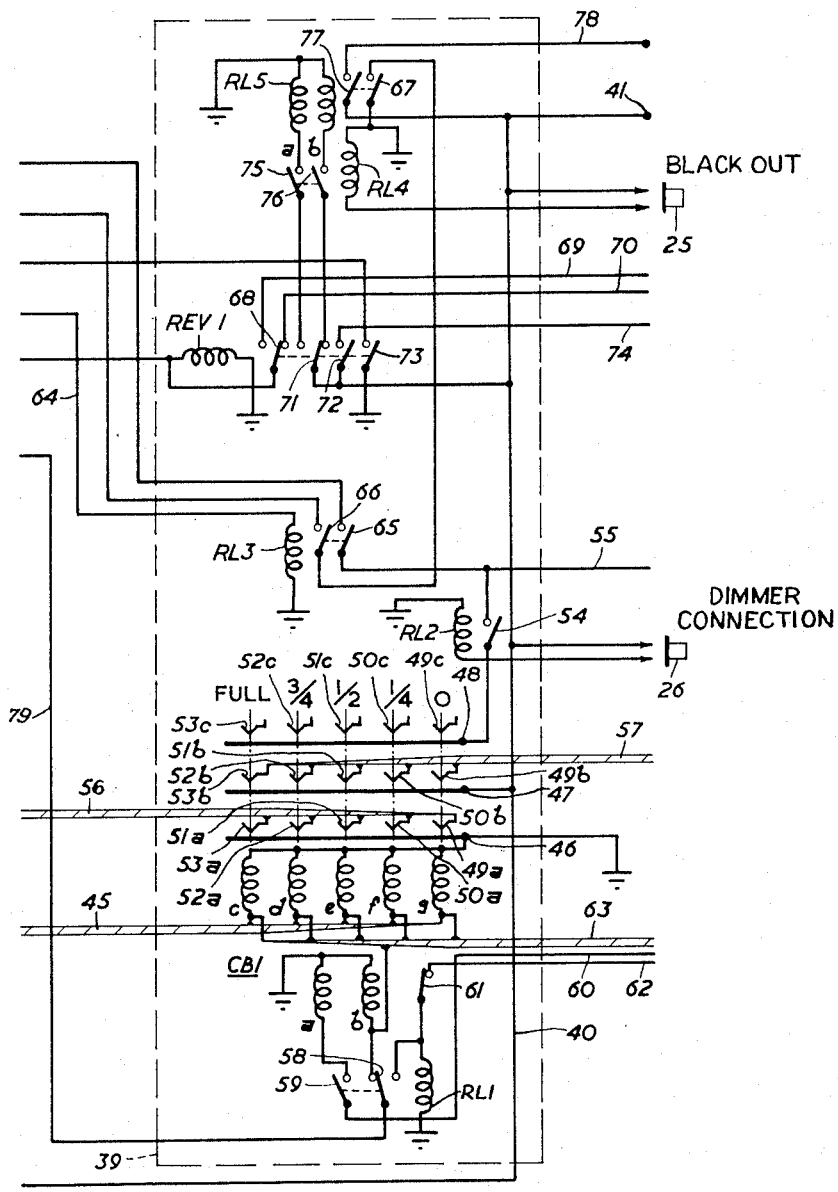

The invention will now be described in more detail with reference to the accompanying drawings illustrating one embodiment of the invention and in which:

FIGURE 1 is a block diagram illustrating a control apparatus according to the invention, FIGURE 2 is a detail showing the arrangement of the control buttons on the console or control desk of FIGURE 1, FIGURES 3a and 3b together give a diagrammatic circuit arrangement of the apparatus and FIG. 4 is a diagrammatic showing of a dimmer and associated apparatus.

Referring firstly to FIGURES 1 and 2, the apparatus according to the invention is shown as comprising a console or control desk 1 provided with a plurality of push buttons (FIGURE 2) for controlling stage lighting circuits as will hereinafter be more fully described. The console is connected by a multiwire cable 3 to an equipment unit 4 comprising shift couplers 5, store units 6, a cue unit 7 and master unit 8 which are actuated in a manner hereinafter described according to the operation of the push buttons of the console 1.

The store units 6 and master unit 8 are connected to a dimmer bank 9 comprising a plurality of dimmers, the setting of which is controlled by the transposing units 6. The equipment unit 4 has also connected thereto, a card punching apparatus 10 to enable a given setting of the transposing units to be recorded on a card and a card reading apparatus 11, by means of which transposing units can be set according to the punching on a card.

As shown in FIGURE 2, the push buttons provided on the console 1 comprise two sets of five rows of seven buttons for controlling the operation of the stage lighting circuits. Each row of buttons comprises five dimmer position buttons 12, a dimmer switch button 13 and a dimmer state button 14. The five buttons 12 are arranged to give varying degrees of dimming and in the example shown, actuation of the first button of each row (the lowermost button as shown in FIGURE 2) gives a dimmer setting of 0, the second button a dimmer setting of ¼, the third button a dimmer setting of ½, the fourth button a dimmer setting of ¾ and the fifth button a dimmer setting of full lighting. The dimmer switch button 13 controls the operation of a black-out or lighting circuit interruptor relay and operation of the dimmer state button connects the dimmer circuit to a meter 15 to indicate the condition of the dimmer. In addition there are provided five shift buttons 24, a "blackout" button 25, and a "dimmer connection" button 26, the functions of which will hereinafter be described with reference to FIGURES 3a and 3b.

Referring now to FIGURE 3a, there is shown at the left hand side of the figure, one row of push buttons consisting of five dimmer position buttons 12a to 12e, a dimmer switch button 13 and a dimmer state button 14. The push buttons are provided with translucent tops and associated with each button is a lamp 16 which lights and illuminates the button to indicate the circuit conditions as will hereinafter be described. The five dimmer position buttons 12a to 12e in the example shown are arranged to vary the dimmer condition from zero to full light in quarter steps. Thus button 12a is operated to drive the dimmer to give zero light, 12b to give ¼ light, 12c to give ½ light, 12d to give ¾ light and 12e to give full light. Each button 12a to 12e is provided with three contacts 17, 18 and 19 and a bridging member 20, the arrangement being such that upon pressing the button, the bridging member 20 first connects the contacts 17 and 19 and when the button is fully depressed, contact 18 is connected to the contacts 17 and 19, the push buttons 13 and 14 are each provided with only two contacts 21 and 22 and a bridging member 23 which connects contacts 21 and 22 when the button is operated. The row of push buttons 12a to 12e, 13 and 14 are connected to a shift coupler indicated generally at 27 and which comprises a multicontact relay arrangement having a plurality of fixed contacts 28a to 28r, each enagageable by five movable contacts 29a to 29r, 30a to 30r, 31a to 31r, 32a to 32r and 33a to 33r, the movable contacts being arranged in vertical sets each of which is operable upon energisation of an appropriate one of magnet coils 34, 35, 36, 37 and 38.

Thus upon energisation of the coil 34 for example, the set of movable contacts 29a to 29r is operated to establish connection between the push buttons 12a to 12e, 13 and 14 with a store unit indicated generally at 39 (FIG. 3b) which controls the operation of a dimmer (FIG. 4) in accordance with the setting of the push buttons. There is one store unit 39 connected to each set of movable contacts 29 to 33 respectively and it will be apparent that the row of push buttons 12a to 12e, 13 and 14 can be connected to any one of five store units upon energisation of the appropriate one of the magnet coils 34 to 38 by operating the corresponding shift button 24 to establish a connection from earth through the magnet coil and the contacts of the shift button over lead 40 to positive supply at 41. The lead 40 is also connected to the contacts 19 of the push buttons 12a to 12e and to the contacts 22 of the push buttons 13 and 14. The contacts 17 of the push buttons 12a to 12e are connected respectively through a multi-wire cable 43 to the fixed contacts 28a to 28e of the shift coupler 27 while the contacts 18 of the push buttons 12a to 12e are connected in common over lead 42 to the fixed contact 28l of the shift coupler. The lamps of the push buttons 12a to 12e are connected on one side of the positive supply lead 40 and on the other side through a multi-wire cable 44 to the fixed contacts 28f to 28k respectively of the shift coupler.

The movable contacts 29a to 29e of the shift coupler are connected through a multi-wire cable 45 to one side of magnet coils g, f, e, d, and c, respectively of a relay CB1 of the store unit 39. The other side of each of the magnet coils g to c is connected to earth and it will be apparent that when the appropriate shift button is operated to energise the magnet coil 34, a circuit is established from the magnet coils g to c through the movable contacts 29a to 29e and fixed contacts 28a to 28e of the shift coupler to the contacts 17 of the dimmer position push buttons 12a to 12e. The relay CB1 also includes three fixed contacts 46, 47 and 48 and five sets of three movable contacts 49a, 49b and 49c, 50a, 50b and 50c, 51a, 51b and 51c, 52a, 52b and 52c and 53a, 53b, and 53c respectively, the sets of movable contacts being operated under the control of the magnet coils g to c respectively. The fixed contact 46 is connected to earth, the fixed contact 47 is connected to the positive supply lead 40 and the fixed contact 48 is connected through a normal open contact 54 of relay RL2 and over lead 55 to one of the dimmers (FIG. 4) of the dimmer bank 9. The operating coil of relay RL2 is connected on one side to earth and on the other side through the contacts of the "dimmer connection" button 26 to the positive supply lead 40, so that upon operating the button 26, the relay RL2 operates to connect over its contact 54 the fixed contact 48 with the dimmer lead 55.

The movable contacts 49a to 53a are connected through a multi-wire cable 56 to the movable contacts 29f to 29k respectively of the shift coupler and upon energisation of the magnet coil 34 for example, circuits are established through the fixed contacts 28f to 28k to the respective lamps 16 of the dimmer position buttons 12a to 12e. The movable contacts 49b to 53b are connected over a multi-wire cable 57 to the card punch 10 and movable contacts 49c to 53c are connected respectively to 0, ¼, ½, ¾ and full control voltage.

Thus upon operation of one of the said sets of movable contacts of the store unit for example, contacts 51a, 51b and 51c as will hereinafter be described, the contact 51a establishes a circuit from earth, fixed contact 46, movable contact 51a, cable 56, movable contact 29h, fixed contact 28h, cable 44, lamp 16 of button 12c, lead 40 to positive supply 41. The lamp 16 illuminates the button 12c to indicate that the dimmer control is set to ½. The movable contact 51b establishes a circuit from the supply lead 40, fixed contact 47, movable contact 51b and cable 57 to the card punch 10, and movable contact 51c connects ½ control voltage to the fixed contact 48 for operating the dimmer upon closure of the "dimmer connection" button 26.

The relay CB1 also includes a core (not shown) having a magnetising winding a and a demagnetising winding b the core having associated therewith an armature which in known manner locks the movable contacts against operation by the magnet coils c to g when the armature is operated and permits operation of the contacts when the armature is released.

The winding b is connected on one side to earth and on the other side through a change-over contact set 58 of a relay RL1 and over lead 79 to movable contact 29l of the shift coupler, and the winding a is connected on one side to earth and on the other side through a normal open contact 59 of the relay RL1 and over lead 60 to the card reader 11. The operating coil of the relay RL1 is connected on one side to earth and on the other side to the change-over contact set 58 and also through a normally made contact 61, of relay CB1 and over lead 62 to the card reader 11. The magnet coils c to g of the relay CB1 are connected over a multi-wire cable 63 to the card reader so that the coils will be energised according to information read from cards fed into the card reader.

The store unit also includes a dimmer state relay RL3 having an operating coil connected from earth over lead 64 to movable contact 29o of the shift coupler for connection through the fixed contact 28o to the contact 21 of the dimmer state push button 14. The relay RL3 has two normally open contacts 65 and 66, the contact 65 serves to connect the dimmer lead 55 to movable contact 29r of the shift coupler and contact 66 connects the movable contact 29q of the shift coupler to a normally open contact 67 of a relay RL5. A reversing relay REV1 is also provided on the store unit and has its operating winding connected between earth and the movable contact 29n of the shift coupler and also to a change-over contact set 68 of the relay REV1 to which leads 69 and 70 from the card reader 11 are connected. In addition to the change-over contact set 68, the relay REV1 is also provided with a further change-over contact set 71 and two normally open contacts 72 and 73 respectively. The contact 73 serves to connect earth to movable contact 29p of the shift coupler and contact 72 connects the positive supply lead 40 over lead 74 to the card punch 10. The relay RL5 is a store relay having a magnetising coil a and demagnetising coil b which coils are connected through normally open contacts 75 and 76 respectively of a relay RL4 to the change-over contact set 71 of the relay REV1. The operating coil of relay RL4 is connected between earth and one contact of the "blackout" button 25, the other contact of which is connected to the positive supply lead 40, so that upon operation of the button 25, relay RL4 is operated and over its contacts 75 and 76 connects the windings a and b of relay RL5 to the change-over contact set 71 of relay REV1. A further contact 77 of relay RL5 serves to connect positive supply 41 to lead 78 connected to the blackout or circuit interrupter (not shown).

As shown in FIG. 4, the dimmer bank 9 is driven by an electric motor 80 which drives a shaft 81 common to all the dimmers of the bank. Each dimmer comprises a clutch wheel 82 (only one of which is shown in the figure) mounted on the shaft 81 for rotation therewith and co-operating in known manner with two electromagnetically operated driven elements (not shown) the operating coils for which are shown at 83 and 84 respectively. The said driven elements are drivingly connected to a drive shaft indicated in broken line at 85, for driving the shaft 85 in one direction or the other depending on which of the coils 83 and 84 is energised. The shaft 85 is drivingly connected to the moving contact 86 of a dimmer 87 connected in a lighting circuit and also the movable contact 88 of a potentiometer 89 connected between positive potential and earth. Thus upon energisation of one or other of the coils 83 and 84, the drive shaft 85 is rotated in one direction or the other to move the contact 86 of the dimmer to increase or decrease the resistance thereof, the contact 88 of the potentiometer following the movement of the dimmer contact.

The coils 83 and 84 are connected on one side to earth and on the other side to the fixed contacts 90 and 91 of a centre stable polarised relay 92 the moving contact 93 of which is connected to positive potential and normally occupies the centre stable position shown in FIG. 4 and is movable in one direction or the other to engage with one or other of the fixed contacts 90 and 91 in dependence on the direction of current flow through the winding 94 of the relay. The winding 94 is connected on one side to the movable contact 88 of the potentiometer and on the other side to the lead 55 (FIG. 3b) and it will be apparent that upon operation of the dimmer connection button 26 the voltage corresponding to the dimmer condition stored by relay CB1 is applied from the appropriate movable contact 49c to 53c, fixed contact 48, relay contact 54, lead 55, winding 94 of relay 92, to the movable contact 88 of the potentiometer. If there is a difference in potential between the appropriate contact of the relay CB1 and the movable contact 88, current flows through the winding 94 to cause the relay contact 93 to close the circuit of one of the coils 83 and 84 thereby to drive the potentiometer contact 88 in a direction to balance the potential difference, the dimmer contact 86 being moved in unison. When balance is reached the relay contact 93 returns to its centre position and the dimmer and the potentiometer remain in their set position.

In operation of the circuits described, if for example, it is desired to set a dimmer to the full position, the dimmer position button 12e is operated and also the shift button 24 corresponding to the magnet coil 34. A circuit is then established from positive supply lead 40, contacts 19 and 17 of button 12e, fixed contact 28e of the shift coupler, movable contact 29e, coil c of relay CB1, to earth, thereby energising the coil and when the button 12a is fully operated a further circuit is established from positive supply lead 40, contacts 19 and 18, fixed contact 28l of the shift coupler, movable contact 29l, contact 58 of relay RL1, demagnetising winding b of relay CB1 to earth. The armature of relay, CB1 is thereby released to permit the coil c to operate the movable contacts 53a, 53b, and 53c. The release of the armature also causes closure of contact 61 and positive supply is fed from the card reader over lead 62, made contact 61 and coil of relay RL1 to earth. Relay RL1 operates and at its contact 59 connects the magnetising winding a over lead 60 to positive supply at the card reader while its change-over contact 58 connects the winding of relay RL1 to positive supply over lead 79 and through the contacts 18 and 19 of button 12e. The energisation of magnetising winding a, magnetises the core of relay CB1 and locks in the movable contacts 53a, 53b and 53c and the selected dimmer position is now permanently stored for transmission over lead 55 to the associated dimmer upon operation of the "dimmer connection" button 26. At contact 53b the positive supply lead 40 is connected over cable 57 to the card punch and upon operation of a card punch button (not shown) the card will be punched to indicate full dimmer position.

It will be apparent that similar opreation of the relay CB1 can be effected from the card reader by reason of its connections through cable 63 and leads 60 and 62 and once the dimmer condition is set according to information read from a card, the condition can be changed by operating an appropriate one of the dimmer position buttons 12a to 12e, the operation of which will cause the relay CB1 to cancel the setting determined by the card reader and to reset the dimmer position according to the dimmer position button which has operated.. The reversing relay REV1 is a two position relay which operates from one position to the other upon each energisation of its coil, either by operation of the dimmer switch button 13 or from the card reader over lead 69 or 70. The position of the relay REV1 is stored by relay RL5 for transmission to the black-out relay upon operation of the "blackout" button 25. At the same time, the lamp 16 of the dimmer switch button 13 is illuminated or not according to the position of the relay REV1.

It will be seen that in the apparatus described, one row of push buttons can be used to set the position of five dimmers by means of the five store units connected to the shift coupler 27. The dimmer setting is indicated to each store unit upon operation of the appropriate shift button 24 and is stored by operation of the relays CB1 and RL1 of the store unit until operation of the "dimmer connection" button 26. Similarly, the reversing relay position is stored by operation of the relay RL5 in the appropriate store unit for operating or not the black-out relay upon operation of the "blackout" button 25. The store units can also be set by information supplied by the card reader and the setting of the store units can be transmitted to the card punch. When it is required to ascertain the state of any given dimmer circuit, the dimmer state button 14 and the appropriate shift buttaon 24 are operated to connect the meter 15 to the dimmer lead 55 so that the meter will record the control volts applied to the dimmer and the lamp 16 of the button 14 will be illuminated if the black-out relay is operated.

It will be understood that the invention is not limited to the embodiment described. For example, there may be more than five dimmer position buttons to give a larger number of lighting intensity steps and there may be more than five store units connected to each shift coupler. In addition, there may be provided on the console 1 a luminous indicator for indicating and identifying the number of a card inserted in the card reader or in the card punch. The apparatus may also include means for varying the speed of the dimmer bank motor 80.

It will be further understood that although the apparatus has been described specifically with respect to mechanically operated dimmers which have inertia, further forms of dimmers not having inertia could be used but in this case, it would be necessary to provide a second dimmer position store from which to cross-fade and feed in at the dimmer lead 55 when changing from one dimmer setting to another. Similarly, although the apparatus described utilises punched cards for storing information regarding the dimmer settings, it will be understood that other forms of recorder such as for example, magnetic tape or magnetic drums may also be employed.

We claim:

1. Control apparatus for the control of stage lighting comprising a plurality of lighting circuits, a dimmer device connected in each lighting circuit varying the intensity of illumination provided by the circuit, switching means associated with each dimmer device for effecting actuation thereof to give a required intensity of illumination, a group of switches presettable for selecting a required intensity of illumination in a lighting circuit, and means for selectively connecting said group of switches to any one of the said switching means to cause the switching means to actuate the associated dimmer device to give the illumination selected by the setting of the group of switches.

2. Control apparatus for the control of stage lighting comprising a plurality of lighting circuits, a plurality of dimmers, one connected with each lighting circuit for varying the intensity of illumination provided by the circuit, a plurality of store units, one connected to each dimmer for effecting operation thereof in accordance with an electrical condition stored in the store unit, a plurality of switch contacts in each store unit for establishing the said electrical condition, means for operating each of said plurality of contacts, a shift coupler, an input to said shift coupler, a plurality of outputs to said shift coupler, means connecting each of said outputs to a separate one of said store units, means for selectively connecting the said input to any one of said outputs, a set of switches each operable to give a pre-determined dimmer setting, and means connecting the set of switches to the input of the shift coupler whereby the set of switches can be connected through the shift coupler to the contact operating means of a selected one of said store units for operating switch contacts of the store unit to establish the electrical condition require to actuate the associated dimmer to the setting determined by operation of said set of switches.

3. Control apparatus as claimed in claim 2 in which said set of switches comprises a set of push button switches for predetermining the setting of a dimmer in steps from no light to full light according to which push button switch is operated, each said push button switch having a lamp associated therewith for illuminating the push button when the associated switch is operated.

4. Control apparatus as claimed in claim 2 and including apparatus for reading information stored on a recording medium and means connecting said apparatus to the store unit contact operating means for effecting actuation thereof in accordance with the stored information.

5. Control apparatus as claimed in claim 2 and including a recording means and means connecting the said switch contacts to the recording means for recording the electrical condition established upon operation of selected of said switch contacts.

6. Control apparatus for the control of stage lighting comprising a plurality of lighting circuits, a plurality of dimmers, one connected with each lighting circuit for varying the intensity of illumination provided by the circuit, a plurality of store units, one connected to each dimmer for effecting operation thereof, a set of switches each operable to give a predetermined setting of a dimmer, a shift coupler connected to said set of switches for selectively connecting said set of switches to one of said plurality of store units for operating the switch contacts of the selected store unit in accordance with the setting of the set of switches, each said store unit comprising a store relay having a plurality of operating windings corresponding in number to the number of switches in the said set of switches, switch contacts associated with each winding, a plurality of voltage sources of differing potential connected to said switch contacts, means connecting the switch contacts to the dimmer whereby energisation of a selected one of said operating windings actuates the associated switch contact to connect one of said voltage sources to the dimmer, and means for locking in the operated switch contacts thereby to store the dimmer setting until required, and a relay operable to connect the operated switch contacts to the dimmer circuit.

7. Control apparatus for the control of stage lighting comprising a plurality of lighting circuits, a plurality of dimmers, one connected with each lighting circuit for varying the intensity of illumination provided by the circuit, a plurality of store units, one connected to each dimmer for effecting operation thereof in accordance with an electrical condition stored in the store unit, a plurality of switch contacts in each store unit for establishing the said electrical condition, means for operating each of said plurality of contacts, a set of switches each operable to give a predetermined setting of a dimmer and a shift coupler for selectively connecting said set of switches to one of said store units, the said shift coupler comprising a multi-contact relay having a plurality of sets of contacts, a separate winding for operating each set of contacts, means connecting each of the set of switches to a separate one of the contacts of a set, means connecting each set of contacts to one of the store units, and switch means connected to each operating winding for selectively operating one set of contacts thereby to connect the set of switches to the store unit connected to said one set of contacts.

References Cited in the file of this patent

UNITED STATES PATENTS

| 2,233,808 | Burke | Mar. 4, 1941 |
| 2,659,038 | Heyer | Nov. 10, 1953 |